US012738136B2

(12) United States Patent
Vapurcuyan et al.

(10) Patent No.: US 12,738,136 B2
(45) Date of Patent: Sep. 15, 2026

(54) SYSTEM AND METHOD FOR FIRE DETECTION

(71) Applicant: Siemens Industry, Inc., Alpharetta, GA (US)

(72) Inventors: Alan V. Vapurcuyan, Montville, NJ (US); Paul Richard Strelecki, Whitehouse Station, NJ (US)

(73) Assignee: Siemens Industry, Inc., Alpharetta, GA (US)

( * ) Notice: Subject to any disclaimer, the term of this patent is extended or adjusted under 35 U.S.C. 154(b) by 480 days.

(21) Appl. No.: 18/335,461

(22) Filed: Jun. 15, 2023

(65) Prior Publication Data

US 2024/0420557 A1 Dec. 19, 2024

(51) Int. Cl.
*G08B 17/00* (2006.01)
*G05B 13/02* (2006.01)

(52) U.S. Cl.
CPC .......... *G08B 17/00* (2013.01); *G05B 13/028* (2013.01)

(58) Field of Classification Search
CPC .... G08B 17/00; G08B 21/0275; G08B 21/22; G08B 17/12; G08B 17/125; G08B 21/02; G08B 31/00; G05B 13/028
See application file for complete search history.

(56) References Cited

FOREIGN PATENT DOCUMENTS

| | | | | |
|---|---|---|---|---|
| EP | 3850601 | | 2/2024 | |
| RU | 2179470 | C2 | 2/2002 | |
| WO | 2021240329 | A1 | 12/2021 | |
| WO | WO-2023004277 | A1 * | 1/2023 | .......... H05B 47/196 |
| WO | 2023/017232 | | 2/2023 | |

* cited by examiner

*Primary Examiner* — Catherine T. Rastovski
*Assistant Examiner* — Emma Alexander

(57) ABSTRACT

A building management system for predictive fire detection comprises an input component, a processor, and an output component. The input component receives data corresponding to a personal object entering a building boundary and a location of the object tracked within the building boundary. The personal object is associated with a user profile and a first fire hazard property. The processor determines that the personal object is in a proximity to an area object associated with an area of the building boundary and a second fire hazard property. The processor determines that a fire hazard meets a fire hazard threshold based on a correlation of the first and second fire hazard properties and a proximity of the personal object to the area object. The output component provides a command to perform a fire protection action in response to determining that the probability.

10 Claims, 6 Drawing Sheets

200
204
212
206
214
216
210
208
202
Subsystem #1
(Safety) 218
Controller 224
Controller 224
222
Device 226
Device 226
Device 226
Device 226
Subsystem #2
220
Controller 224
Controller 224
222
Device 226
Device 226
Device 226
Device 226

SYSTEM AND METHOD FOR FIRE DETECTION

FIELD OF THE INVENTION

This application relates to the field of building systems and, more particularly, to fire detection systems and methods used in building management systems that preemptively identify elevated risk levels of potential fire hazards.

BACKGROUND

Building management systems encompass a wide variety of systems that aid in the monitoring and control of various aspects of building operation. Building management systems (which may also be referred to herein as "building control systems") include security systems, fire safety systems, lighting systems, and heating, ventilation, and air conditioning ("HVAC") systems. The elements of a building management system may be widely dispersed throughout a facility or campus.

Building management systems typically have one or more centralized control stations where data from the system may be monitored and system operations may be controlled and/or monitored. To allow for monitoring and control of the dispersed control system elements, building management systems often employ multi-level communication networks to communicate operational and/or alarm information between operating elements, such as sensors and actuators, and the centralized control station.

Conventional fire suppression systems react to fire-related triggers, such as flames or smoke, and alert operators and occupants in response to detecting these triggers. Unfortunately, even with these convention systems, there are still situations where lives are lost, and properties are subjected to substantial damage.

SUMMARY

In accordance with one embodiment of the disclosure, there is provided a predictive approach of elevated risk levels of potential fire hazards for building management systems. The approach identifies the potential fire hazards before an occurrence of the fire hazard. Information is gathered and analyzed in a streamlined manner, even for different communication schemes for multiple control systems, for rapid response to the potential fire hazards.

One aspect is a building management system for predictive fire detection comprising an input component, a processor coupled to the input component, and an output component coupled to the processor. The input component receives data corresponding to a personal object entering a building boundary and a location of the object tracked within the building boundary. The personal object is associated with a user profile and a first fire hazard property. The processor determines that the personal object is in a proximity to an area object. The area object is associated with an area of the building boundary and a second fire hazard property. The second fire hazard property is different from the first fire hazard property. The processor determines that a fire hazard meets a fire hazard threshold based on a correlation of the first and second fire hazard properties and a proximity of the personal object to the area object. The output component provides a command to perform a fire protection action in response to determining that the probability of the fire hazard meets the fire hazard threshold.

Another aspect is a method of a building management system for predictive fire detection. Data corresponding to a personal object entering a building boundary and a location of the object tracked within the building boundary is received. The personal object is associated with a user profile and a first fire hazard property. The personal object is determined to be in a proximity to an area object. The area object is associated with an area of the building boundary and a second fire hazard property. The second fire hazard property is different from the first fire hazard property. A fire hazard is determined to meet a fire hazard threshold based on a correlation of the first and second fire hazard properties and a proximity of the personal object to the area object. A command to perform a fire protection action is provided in response to determining that the probability of the fire hazard meets the fire hazard threshold.

The above-described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
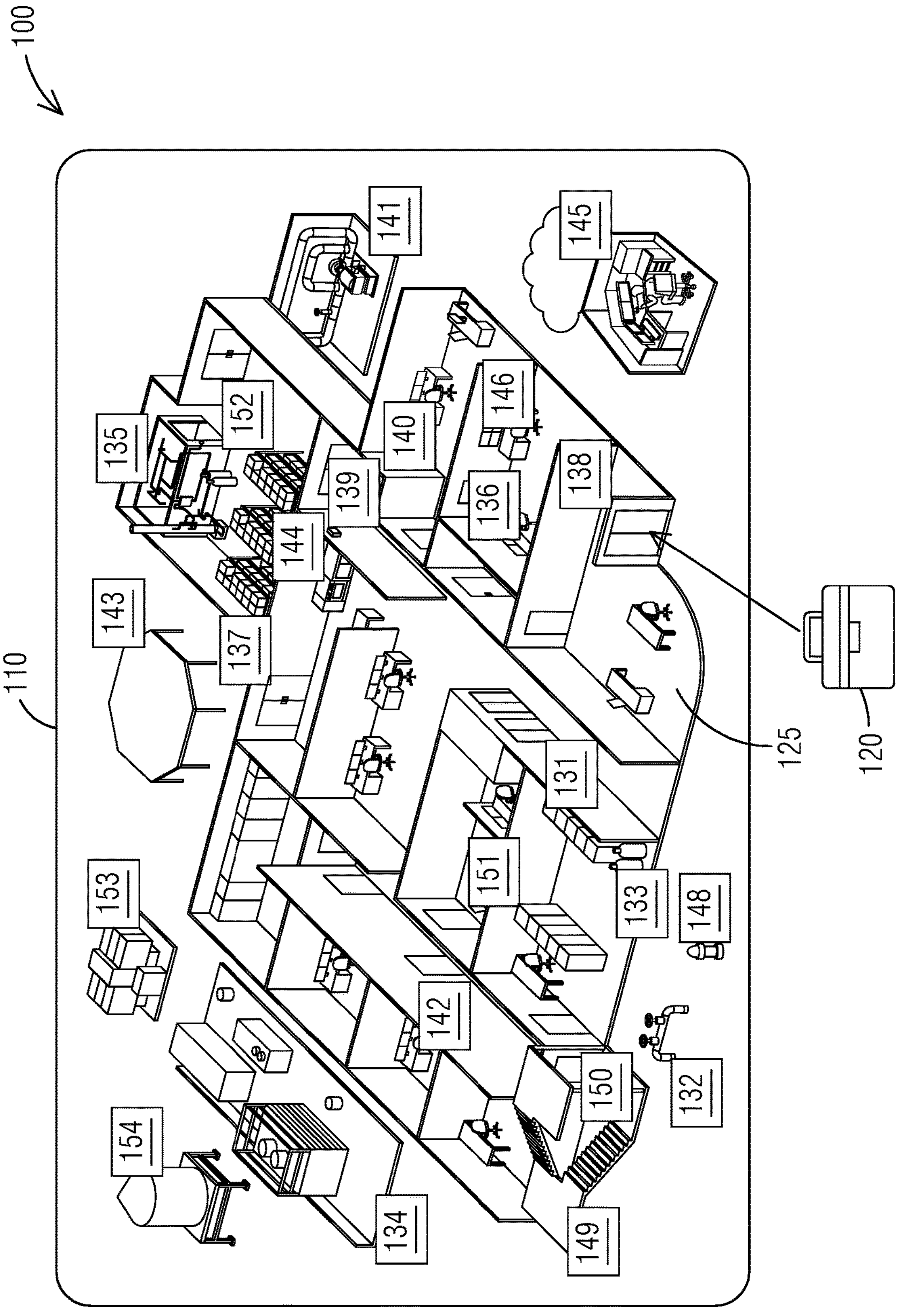
FIG. 1 is an illustration of an environment in an example implementation that is operable to employ techniques described herein.

Various technologies that pertain to systems and methods that facilitate prediction of elevated risk levels of potential fire hazards for a building management system will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

FIG. 1 illustrates an environment in an example implementation that is operable to employ a building management system ("BMS" or "system") 100 and the techniques for predictive fire detection described herein. The building management system 100 may be installed or operated for one or more facilities having a building boundary 110. A personal object 120 may enter the building boundary 110 and a location of the personal object may be tracked within the building boundary. The personal object 120 is associated with a user profile and a first fire hazard property. For example, the personal object 120 may be associated with a user profile corresponding to a user transporting, or otherwise responsible for, the personal object. Also, the first fire hazard property may correspond to a flammable or explosive gas, liquid, solid, or other material or a hazardous source such as a heat source or hazard-catalyst (such as oxygen). The personal object 120 may be associated with the user profile and the first fire hazard property within the building boundary 110, such as a registration area 125; preregistered before entry to the building boundary 110; or a combination of registration techniques. The personal object 120 may be registered automatically via a wired or wireless scanning system registration area 125, a manual entry by a user at the registration area 125, or a combination of automated and manual techniques.

There are multiple areas within the building boundary 110 of a facility or group of facilities, and certain areas may be associated with a potential fire hazard aspect. Examples of such potential fire hazard aspects include, but are not limited to, passages 131, external flow areas 132, laboratory equipment 133, rooftop equipment 134, chemical/material storage 135, office space 136, external access portals 137, electrical equipment 138, internal access portals 139, monitoring systems 140, sublevel equipment 141, environmental control systems 142, external operation equipment 143, appliance areas 144 (such as kitchens and breakrooms), off-site monitoring systems 145, workstations 146, equipment servicing portals 148, floor transport areas 149, inner wall conduits 150, inter-floor/ceiling equipment 151, building maintenance equipment 152, external industrial systems 153, and storage tanks 154.

The location of the personal object 120 may be tracked within the building boundary 110, including the areas associated with potential fire hazard aspects 131-154, in response to entry to the building boundary 110 and/or registration at the registration area 125. Location tracking of the personal object 120 may be accomplished by an indoor location tracking system within the building boundary 110, a tagging system co-located with the personal object, or a combination of indoor tracking and tagging equipment, such as a tag that is tracked by sensors located throughout the building boundary. Location information of the personal object 120 is communicated in real-time to the building management system 100.

For one embodiment, a welder or electrician carrying welding or electrical tools may enter an area. The location of the person and/or tools may be tracked by, in part, monitoring and processing access control data. The risk level of this activity may be elevated, as stored in a fire alarm control panel, as predictive given the higher risk nature of the anticipated work.

For another embodiment, an IT system may monitor and process operations of one or more networking devices, such as a router, for higher risk conditions. For example, temp data (by monitoring and processing IT system). The risk level of this activity may be elevated if the sensed temperature of the networking device rises above a predetermined temperature threshold.

For yet another embodiment, sensors within areas of the building boundary 110 may detect higher risk conditions. For example, an infrared camera of a monitoring system and/or security system may identify a temperature or electrical condition of one or more electrical equipment, such as a circuit breaker tripping or a wire temperature exceeding a threshold.

For still another embodiment, an inventory control system may provide the information about hazardous materials and the location of these hazardous materials within the building boundary 110. For example, the system 100 may determine that hazardous materials may be stored in a co-mingled manner. The classifications and location are known to the inventory control system and should be fed in as an input to the system 100.

For another embodiment, possible (fire) threats to an area being modeled and monitored. The probability rating of a potential hazard may be monitored to identify a condition when the rating rises above a predetermined threshold. For example, the probability rating may be determined by an artificial intelligence ("AI") system based on gathered datasets of already known preemptive fire experiment models.

For yet another embodiments, image or video footage collected by security camera and/or infrared sensors may detect flickers of arcing in and around outlets, subpanels, or electrical closets. In addition to this footage, ground/arc fault interrupters may provide a preemptive view of a brewing fire hazard. Again, for some examples, the collected data may be fed into a unique AI system. The system 100 may combine the collected data into risk-levels based data sets for distribution to other systems for early predictive warning.

Figure 2:
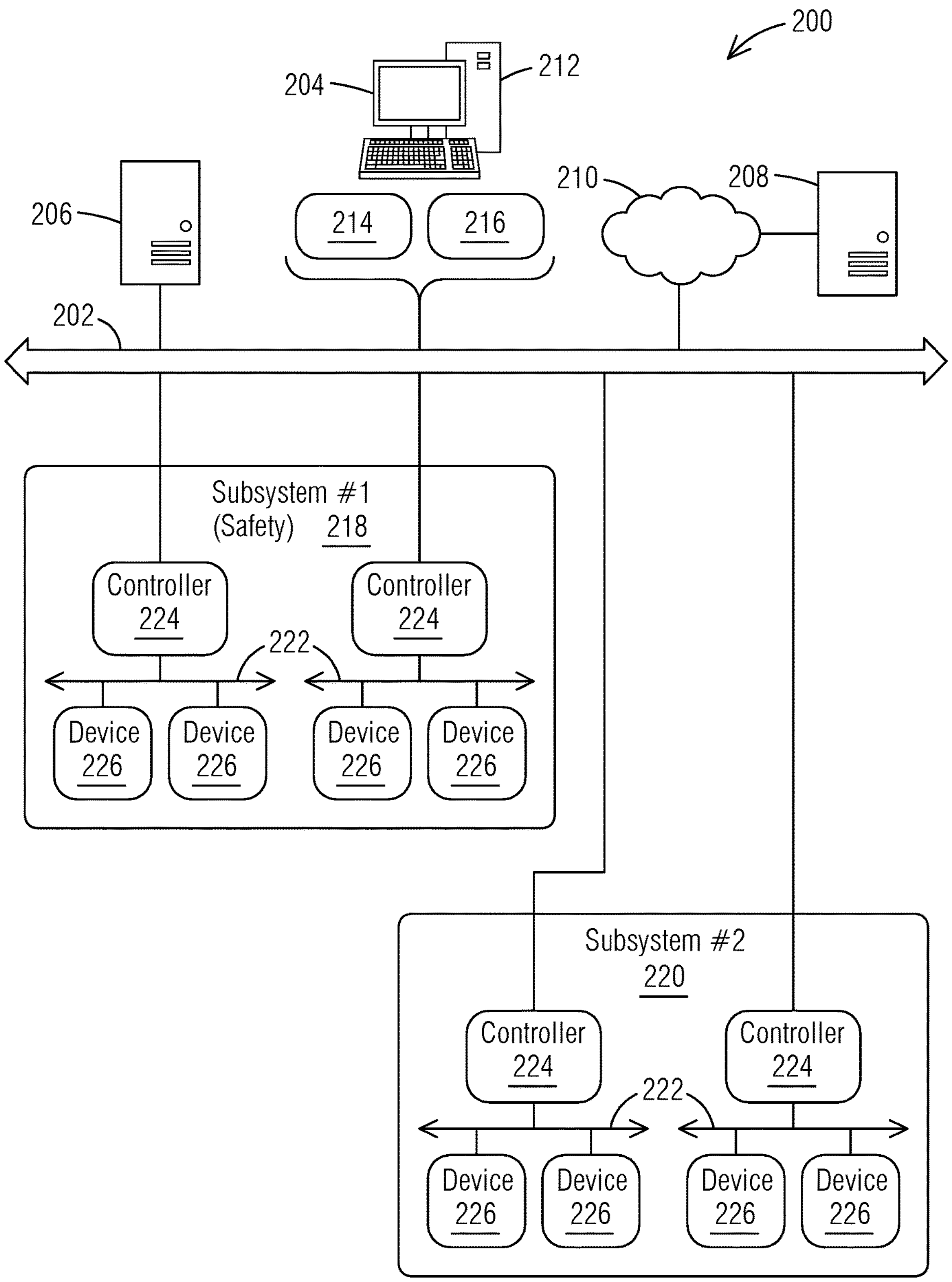
FIG. 2 is a block diagram of a building management system in an example implementation for the environment of FIG. 1.

Referring to FIG. 2, there is shown a block diagram of the building management system ("BMS" or "system") 200 in an example implementation for the environment. The BMS 200 comprises one or more network connections or primary buses 202 for connectivity to components of a management level network ("MLN") of the system 200. For one embodiment, the example BMS 100 may comprise one or more management level devices or management devices, such as a management workstation 204, a management server 206, or a remote management device 208 connecting through a wired or wireless network 210, that allows the setting and/or changing of various controls of the system. A management device may also be a portable management device connecting through a wired or wireless link to an individual automation or field level device of the system 200. While a brief description of the BMS 200 is provided below, it will be understood that the BMS described herein is only one example of a particular form or configuration for a BMS. The system 200 may be implemented in any other suitable manner without departing from the scope of this disclosure. The management devices are configured to provide overall control and monitoring of automation devices, field devices, and other devices of the BMS 200.

One or more management devices of the BMS 200 includes one or more processors 212, one or more input components 214, and one or more output components 216. These components of the management device or devices allow for prediction of elevated risk levels of potential fire hazards for the BMS 200.

For the illustrated embodiment of FIG. 2, the BMS 200 provides connectivity Based on one or more communication protocols to subsystems for various building parameters, such as components of environmental comfort, fire safety, and security systems. Each subsystem 218, 220 may include various types of automation controllers and field devices 224, 226 ("automation controllers") for monitoring and controlling areas within a building or group of buildings. Examples of automation controllers and field devices 224, 226 include, but are not limited to, actuators, field panels, sensors, third-party devices, and the like. These automation controllers and field devices 224, 226 may communicate via one or more communication protocols, such as BACnet, KNX, Lon Works, Modbus, and the like.

Figure 3:
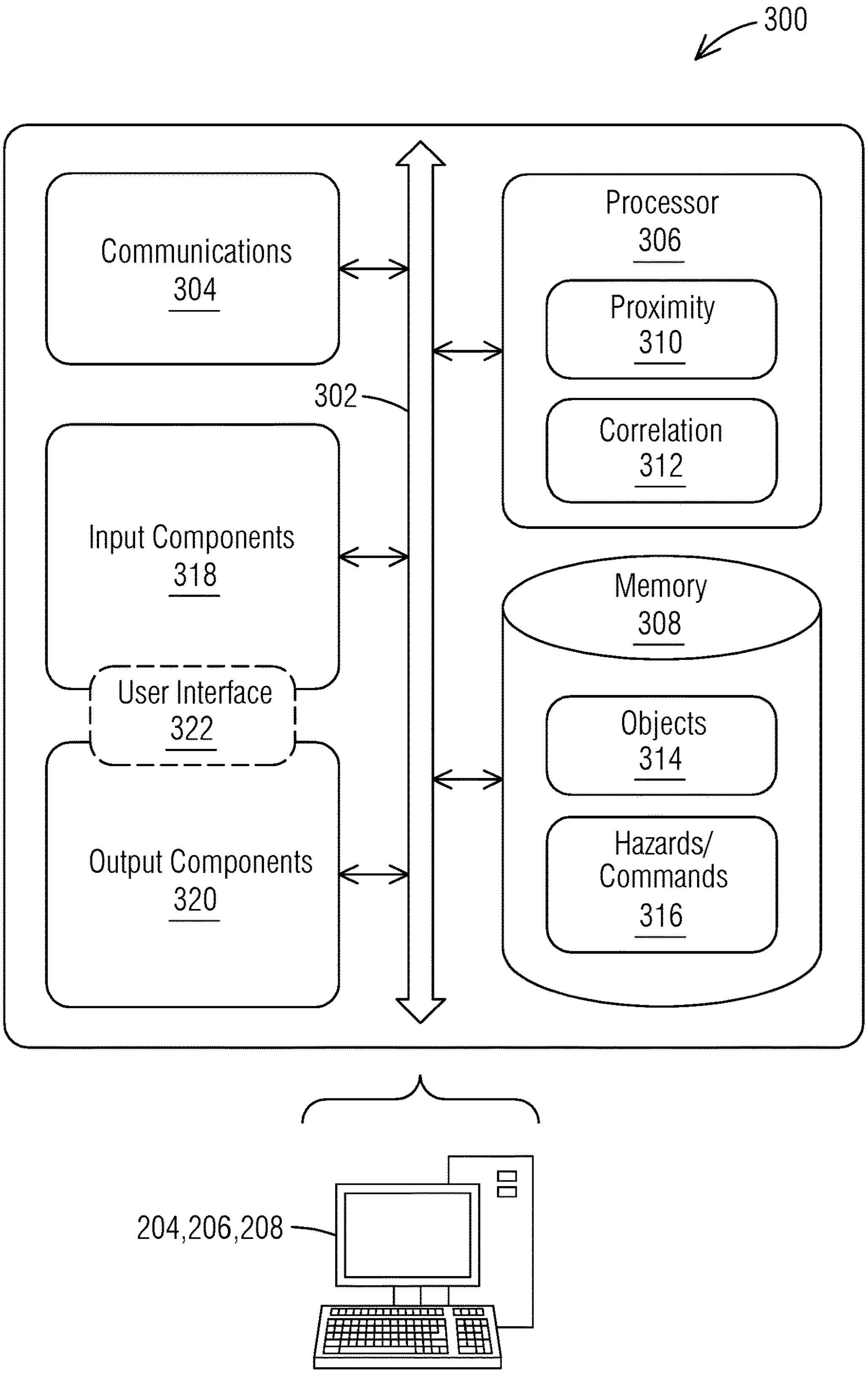
FIG. 3 is a block diagram of a management device in an example implementation for the building management system of FIG. 2.

Referring to FIG. 3, there is shown example components 300 of a management device 204, 206, 208 for the building management system 100, 200. The device components 300 comprise a communication bus 302 for interconnecting other device components directly or indirectly. The other device components include one or more communication components 304 communicating with other entities via a wired or wireless network, one or more processors 306, and one or more memory components 308. The communication component 304 communicates (i.e., receives and/or transmits) data associated with one or more devices of the system 100, 200, such as a mobile device or an external workstation. The communication component 304 may utilize wired or wireless technology for communication.

The processor or processors 306 may execute code and process data received from other components of the device components 300, such as information received at the communication component 304 or stored at the memory component 308. Each application includes executable code to provide specific functionality for the processor 306 and/or remaining components of the management device 204, 206, 208. Examples of applications executable by the processor 306 include, but are not limited to, a proximity module 310 and a correlation module 312. The proximity module 310 of the processor 306 determines whether the personal object is in proximity to the area object in which the area object is associated with an area of the building boundary 110. The correlation module 312 of the processor 306 determines whether the fire hazard meets the fire hazard threshold based on a correlation of hazard properties and proximity of the personal object.

Data stored at the memory component 308 is information that may be referenced and/or manipulated by an operating system or application for performing functions of the management device 204, 206, 208. Examples of data associated with the management device 204, 206, 208 and stored by the memory component 308 may include, but are not limited to, object data 314 and hazards/commands data 316. The object data 314 corresponds to the personal object entering the building boundary 110 and the location of the object within the building boundary, in which the personal object is associated with the user profile and the first fire hazard property. The hazards/commands data 316 includes the first fire hazard property, the second fire hazard property, and one or more commands to perform a fire protection action.

The device components 300 may include one or more input components 318 and one or more output components 320. The input components 318 and output components 320 of the device components 300 may include one or more visual, audio, mechanical, and/or other components. For some embodiments, the input and output components 318, 320 may include a user interface 322 for interaction with a user of the device. The user interface 322 may include a combination of hardware and software to provide a user with a desired user experience. It is to be understood that the communication component 304 may receive input from a remote device and, in such case, may be considered as an input component 318. Likewise, the communication component 304 may provide output to a remote device and, thus, may be considered as an output component 320.

It is to be understood that FIG. 3 is provided for illustrative purposes only to represent examples of the remote or management device 204, 206, 208 and is not intended to be a complete diagram of the various components that may be utilized by the system 100, 200. Therefore, the management device 204, 206, 208 may include various other components not shown in FIG. 3, may include a combination of two or more components, or a division of a particular component into two or more separate components, and still be within the scope of the present invention.

Figure 4:
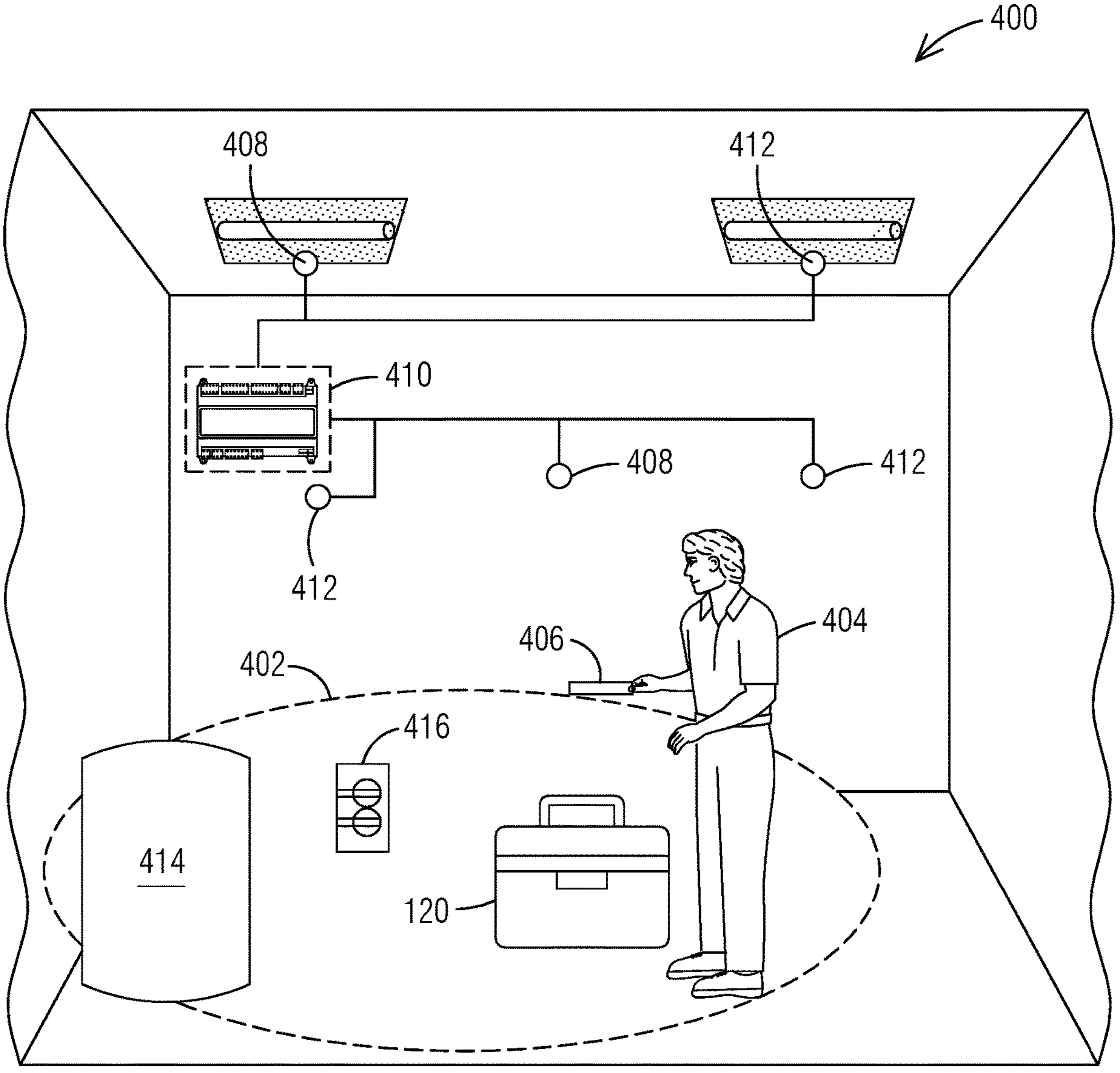
FIG. 4 is an illustration of an example area of the environment of FIG. 1 that is operable to employ techniques of the building management system and management device of FIGS. 2 and 3.

Referring to FIG. 4, there is shown an illustration 400 of an example area 402 of the environment that is operable to employ techniques of the building management system 100, 200 and management device 204, 206, 208. It is to be understood that the area 402 may vary in size dependent on setup and commissioning of the system 100, 200. Thus, the area 402 may cover an entire room, floor, or building, or multiple areas may be included within a room, floor, or building. The example system 100, 200 also shows a personal object 120 that has entered the building boundary 100, 200 and thus a location tracked within the building boundary. The personal object 120 is associated with the user profile and the first fire hazard property, as described above. For some embodiments, the personal object 120 is associated with an occupant 404 of the building. For some embodiments, the personal object 120 and/or the associated occupant 404 may support a mobile tag 406 to facilitate location tracking of the personal object. For example, the mobile tag 406 may be carried, supported, or otherwise co-located with the personal object 120 and/or the occupant 404 such that the location of the mobile tag may be associated with the location of the personal object. The system 100, 200 may also include one or more location sensors 408 and/or wired or wireless gateways 410 to facilitate tracking of the personal object 120 (or mobile tag 406) at the facility.

The building automation system 100, 200 also includes one or more area sensors 412 within each area 402 to assist the management device 204, 206, 208, or a processor of the management device, to recognize a changed characteristic detected by an area sensor 412 of the area 402. The area sensor 412 detects one or more changed characteristics corresponding to a particular fire hazard associated with the first and second fire hazard properties. For some embodiments, the area sensor 412 detects a changed characteristic of the personal object 120 that is located within the area 402 and is associated with the user profile and the first fire hazard property. For some embodiments, the area sensor 412 detects a changed characteristic of an area object 414, 416 located within the area 402 and is associated with the second fire hazard property. For some embodiments, the system 100, 200 may include wired or wireless gateways 410 communicating with the area sensors 412, whether the same as or different from the gateways for location tracking, to monitor of the personal object 120, area objects 414, 416, and their associated fire hazard properties.

Figure 5:
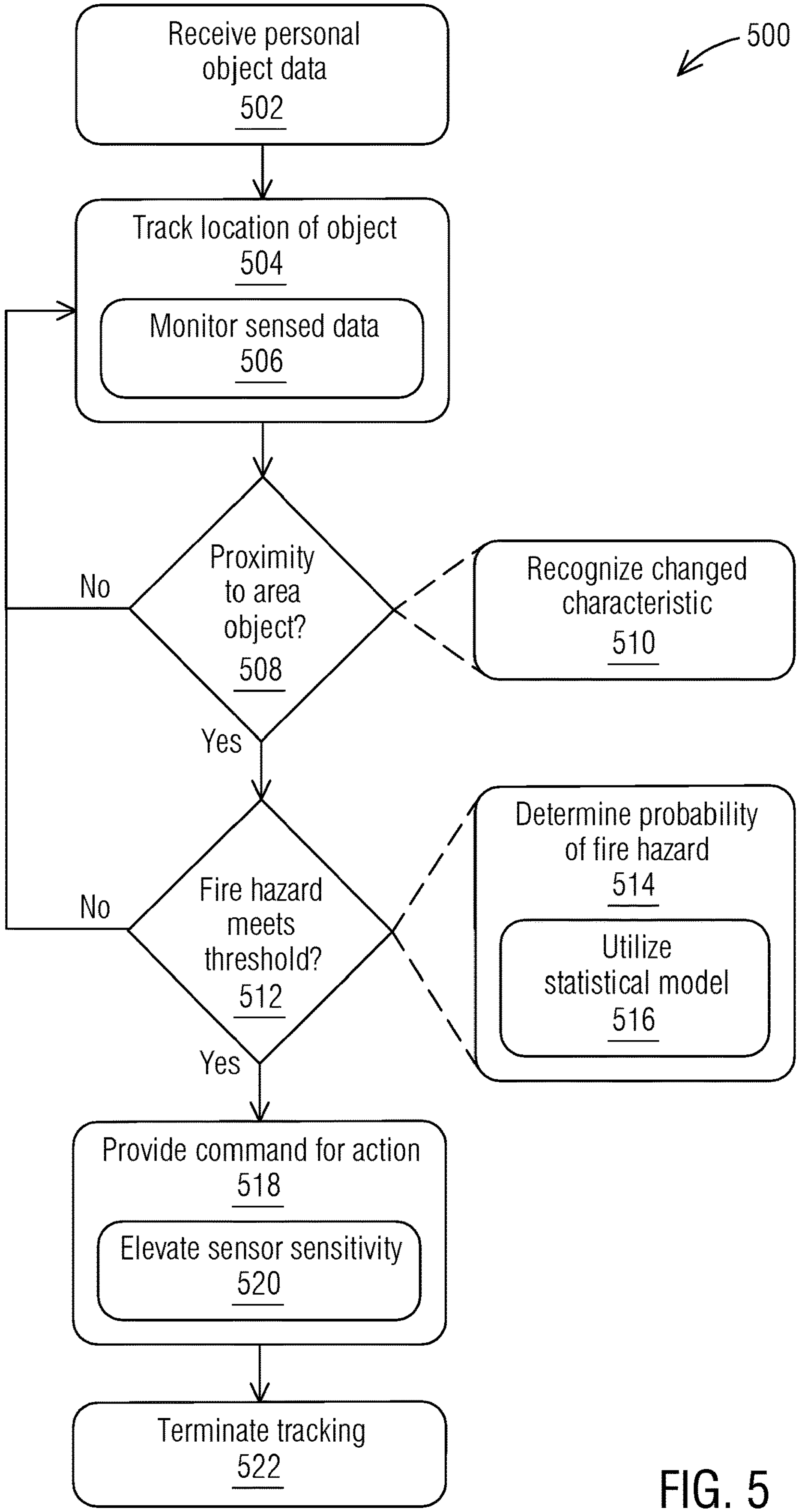
FIG. 5 is a flow diagram of an operation in an example implementation of the management device of FIG. 3.

Referring to FIG. 5, there is shown a flow diagram of an operation 500 in an example implementation of the management device 204, 206, 208. A management device 204, 206, 208, such as an input component 214, 318 of the management device, receives (502) data corresponding to a personal object 120 entering a building boundary 110 and a location of the object tracked within the building boundary. The personal object 120 is associated with a user profile and a first fire hazard property. The BMS or system may track (504) the location of personal object within the building boundary 110 using an object or person tracking subsystem. For some embodiments, the data may be tracked (504) by monitoring (506) sensed data of an indoor positioning system distributed within the building boundary.

In response to initiating the process of tracking (504) the object location, the management device 204, 206, 208, such as a processor 212, 306 of the management device, determines (508) whether the personal object 120 is in a proximity to an area object 414, 416. For example, the processor 212, 306 may determine that the personal object 120 is in the proximity to the area object 414, 416 if the objects are within a predetermined distance from each other or if the objects are located within a common area of the building boundary 110 (such as a room, passageway, floor, department, designated area, or particular location).

The area object 414, 416 is associated with a particular area 402 of the building boundary 110. Also, the second fire hazard property is different from the first fire hazard property. For some embodiments, the device 204, 206, 208 or the processor 212, 306 may determine that the personal object 120 is in proximity to the area object 414, 416 by recognizing (510) a changed characteristic of the personal object 120 detected by the area sensor 412 of the area 402. For some embodiments, the device 204, 206, 208 or the processor 212, 306 may determine that the personal object 120 is in proximity to the area object 414, 416 by recognizing (510) a changed characteristic of the area object detected by an area sensor 412 of the area 402. For these embodiments, the changed characteristic corresponds to a particular fire hazard associated with the first and second fire hazard properties.

In response to determining (508) that the personal and area objects 120, 414, 416 are in proximity to each other, the device 204, 206, 208 or the processor 212, 306 determines (512) that a fire hazard meets a fire hazard threshold based on a correlation of the first and second fire hazard properties and a proximity of the personal object to the area object. Fire hazard properties may be correlated by identifying one property as fulfilling one aspect of a fire hazard and another property as fulfilling another aspect of the same fire hazard. For example, one hazard property may be associated with fuel for a particular fire hazard, and another hazard property may be associated with heat for the particular fire hazard. The fire hazard thresholds may be determined by a calculation by the device 204, 206, 208 or the processor 212, 306 or data stored in a memory component of one or both of these devices.

For some embodiments, determining that the fire hazard meets the fire hazard threshold includes determining (514) a probability that a combination of the first fire hazard property and the second fire hazard property will cause the fire hazard. For example, the fire hazard threshold may be based on the probability being more likely than not that the fire hazard may result, or the fire hazard may be predetermined and stored in a memory component of one or more devices. For some embodiments, determining the probability that the combination of the first fire hazard property and the second fire hazard property will cause the fire hazard includes utilizing (516) a statistical model to draw inferences based on historical data associated with the first and second hazard properties. Examples of statistical models include, but are not limited to, artificial intelligence implement systems or machine learning systems that have been trained based on historical data collected from existing facilities.

In response to determining (512) that a fire hazard meets the threshold, the management device 204, 206, 208, such as an output component 216, 320, of the management device, provides (518) a command to perform a fire protection action in response to determining that the probability of the fire hazard meets the fire hazard threshold. For some embodiments, the device 204, 206, 208 or the output component 216, 320 may elevate a sensitivity of an area sensor 414, 416 located at the area 402 of the building boundary 110. For example, an area sensor 414, 416 may monitor one or more area objects 414, 416 with more frequency, increase the amount of data collected for a particular area object at a given time period, and/or lower the level of the fire hazard threshold for determining the corresponding fire hazard.

For some embodiments, further comprising the device 204, 206, 208, or a component thereof, may terminate the tracking (522) of the location of the personal object 120 in response to identifying that the personal object is no longer within the building boundary 110 or otherwise deregistered by the system 100, 200.

Figure 6:
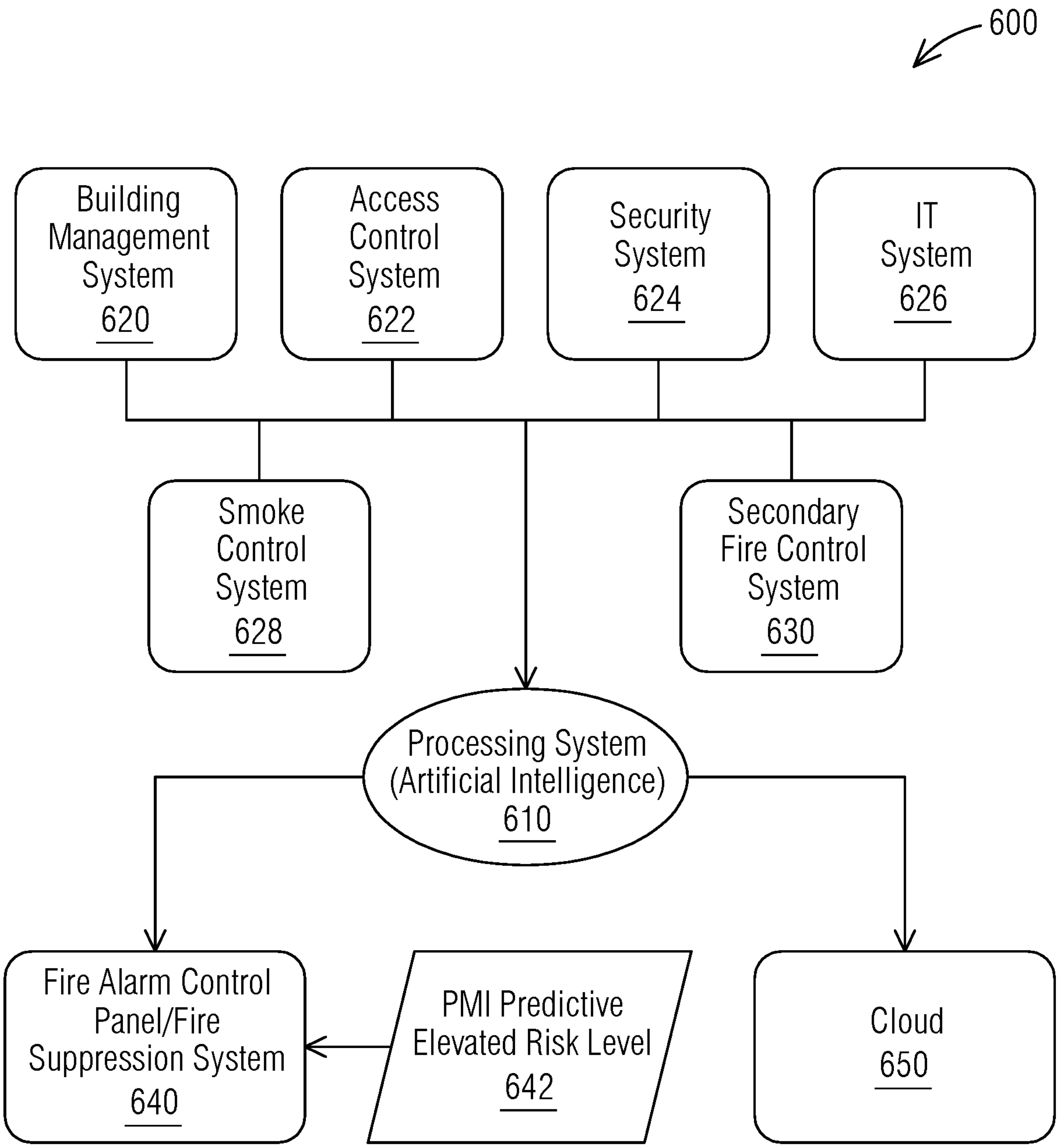
FIG. 6 an operational diagram in an example implementation of a fire detection system that is operable to employ techniques described herein.

Referring to FIG. 6 an operational diagram in an example implementation of a fire detection system 600 that is operable to employ techniques described herein. For this implementation of the fire detection system 600, a processing system 610 collects data associated with one or more personal objects 120 and area objects 414, 416, and the processing system generates one or more commands to perform a fire protection action in response to analyzing and processing the data. The processing system 610 may receive the data associated with one or more personal objects 120, area objects 414, 416, and potential fire hazards from a building management system 520, access control system 622, security system 624, IT system 626, smoke control system 628, and/or one or more secondary fire control systems 630. The processing system 610 then determines that the personal object is in a proximity to an area object and that a fire hazard meets a fire hazard threshold based on a correlation of fire hazard properties and the proximity of the personal and area objects to each other. For some embodiments, the data received from these systems may be analyzed and processing using artificial intelligence technology, such as a machine learning model, to identify one or more potential fire hazards. As a result of this analysis, the processing system 610, provides a command to perform a fire protection action in response to determining that the probability of the fire hazard meets the fire hazard threshold. The command may be provided to fire control equipment 640 (such as an alarm control panel or some other part of a fire suppression system) and/or a remote device associated with the fire detection system 600 that is connected via an external network 650. Based on the command received from the processing system 610 as well as supplemental information 642 associated with fire hazards relating to predictive elevated risk levels, the fire control equipment 640 and/or the remote device may cause the appropriate action or actions to take place to reduce the chances of the fire hazard for occurring.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A building management system for predictive fire detection comprising:

an input component receiving data corresponding to a personal object entering a building boundary and a location of the object tracked within the building boundary by a mobile tag co- located with the personal object and tracked by location sensors distributed within the building boundary, the personal object being associated with a user profile and a first fire hazard property;

a processor coupled to the input component, the processor determining that the personal object is in a proximity to an area object, the area object being associated with an area of the building boundary and a second fire hazard property being different from the first fire hazard property, wherein the processor determines that the personal object is in the proximity to the area object by recognizing a changed characteristic of the personal object detected by an area sensor of the area, the changed characteristic corresponding to a particular fire hazard associated with the first and second fire hazard properties, and by recognizing a changed characteristic of the area object detected by an area sensor of the area, the changed characteristic corresponding to the particular fire hazard associated with the first and second fire hazard properties, wherein the processor determines that a fire hazard meets a fire hazard threshold based on a correlation of the first and second fire hazard properties and a proximity of the personal object to the area object, wherein the processor determines a probability that a combination of the first fire hazard property and the second fire hazard property will cause the fire hazard, and wherein the processor utilizes a statistical model to draw inferences based on historical data associated with the first and second hazard properties; and an output component coupled to the processor, the output component providing a command to perform a fire protection action in response to determining that the probability of the fire hazard meets the fire hazard threshold, wherein the fire protection action includes elevating a sensitivity of an area sensor located at the area of the building boundary, in response to the correlation of the first and second fire hazard properties and the proximity of the personal object to the area object.

2. The building management system as described in claim 1, wherein the input component receives sensed data of an indoor positioning system distributed within the building boundary.

3. The building management system as described in claim 1, wherein a first fire hazard is a heat-based fire hazard, and a second fire hazard is a fuel-based fire hazard.

4. The building management system as described in claim 1, wherein a first fire hazard is a fuel-based fire hazard, and a second fire hazard is a heat-based fire hazard.

5. The building management system as described in claim 1, the processor terminates the tracking of the location of the object in response to identifying that the personal object is no longer within the building boundary.

6. A method of a building management system for predictive fire detection, the method comprising:

receiving data corresponding to a personal object entering a building boundary and a location of the object tracked within the building boundary by a mobile tag co-located with the personal object and tracked by location sensors distributed within the building boundary, the personal object being associated with a user profile and a first fire hazard property;

determining that the personal object is in a proximity to an area object, the area object being associated with an area of the building boundary and a second fire hazard property different from the first fire hazard property, wherein determining that the personal object is in the proximity to the area object includes recognizing a changed characteristic of the personal object detected by an area sensor of the area, the changed characteristic corresponding to a particular fire hazard associated with the first and second fire hazard properties, and recognizing a changed characteristic of the area object detected by an area sensor of the area, the changed characteristic corresponding to the particular fire hazard associated with the first and second fire hazard properties;

determining that a fire hazard meets a fire hazard threshold based on a correlation of the first and second fire hazard properties and a proximity of the personal object to the area object, including determining a probability that a combination of the first fire hazard property and the second fire hazard property will cause the fire hazard, and utilizing a statistical model to draw inferences based on historical data associated with the first and second hazard properties; and providing a command to perform a fire protection action in response to determining that the probability of the fire hazard meets the fire hazard threshold, the fire protection action including elevating a sensitivity of an area sensor located at the area of the building boundary, in response to the correlation of the first and second fire hazard properties and the proximity of the personal object to the area object.

7. The method as described in claim 6, wherein receiving the data corresponding to the location of the object tracked within the building boundary including monitoring sensed data of an indoor positioning system distributed within the building boundary.

8. The method as described in claim 6, wherein a first fire hazard is a heat- based fire hazard, and the second fire hazard is a fuel-based fire hazard.

9. The method as described in claim 6, wherein a first fire hazard is a fuel- based fire hazard, and the second fire hazard is a heat-based fire hazard.

10. The method as described in claim 6, further comprising terminating the tracking of the location of the object in response to identifying that the personal object is no longer within the building boundary.

* * * * *